May 31, 1927.  T. O. NALL ET AL  1,631,105

FLOUR SIFTER

Filed June 10, 1926

INVENTORS:
Torney O. Nall
Ernest J. Beauvais
BY David E. Carlsen
ATTORNEY.

Patented May 31, 1927.

1,631,105

UNITED STATES PATENT OFFICE.

TORNEY O. NALL AND ERNEST J. BEAUVAIS, OF ST. PAUL, MINNESOTA.

FLOUR SIFTER.

Application filed June 10, 1926. Serial No. 115,023.

Our invention relates to an improved flour sifter and the object is to provide a simple, highly efficient sifter in which flour and the like are thoroughly stirred and subsequently sifted in one operation.

Figure 2:
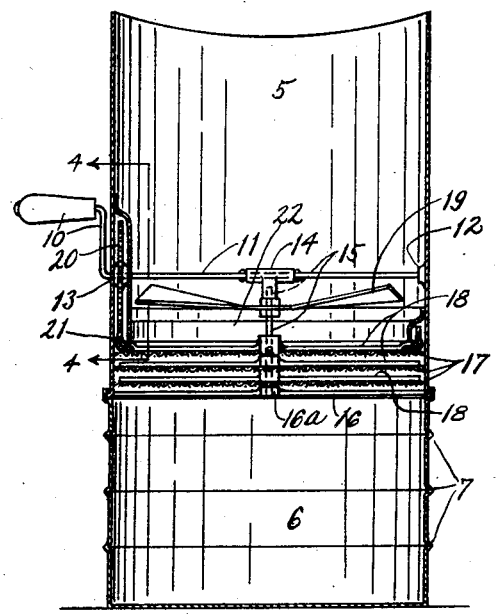
Fig. 2 is a vertical sectional view of the device as on line 2—2 in Fig. 1 and including a measuring cup.
Figure 4:
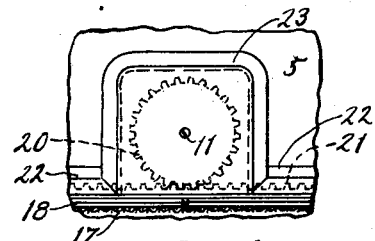
Fig. 4 is an interior elevation of the gear housing and adjacent parts of our device, about as on line 4—4 in Fig. 2.

Referring to the drawing by reference numerals, 5 designates a usual type of cylindrical receptacle or shell open at both ends and preferably adapted to be placed concentrically on an upwardly flanged measuring cup 6 having vertically spaced circumferential lines 7 indicating various quantities of flour sifted into said cup. The main receptacle is provided with a suitable handle 8 and the measuring cup likewise has a handle 9. 10 is any suitable type of hand operated crank adjacent the side of the sifter and comprising preferably an integral extension of a horizontal diametral shaft 11 extending across the interior of the receptacle and suitably journaled as at 12 and 13. At the center of the receptacle we provide a T-shaped bearing 14 through the horizontal part of which the shaft 11 extends. The vertically depending leg of the bearing comprises a journal for the upper end of a central vertically arranged shaft 15 the lower end of which is journaled in the center bearing 16ª of a horizontal spider 16 fixed to shell 5 at the lower end of the said shell (see Fig. 2). Above said bearing 16ª we provide a series (preferably three) of vertically spaced horizontally disposed wire screens 17 of suitable mesh and above each screen is fixed on shaft 15 a spider 18 all said spiders having preferably the same number of arms. Between the upper spider and the bearing 14 we provide a stirring member 19 fixed on shaft 15 and comprising preferably a two-armed rotatable propeller-like stirrer normally in spaced relation to the upper screen and its blades twisted slightly to thoroughly cut and stir the flour and also impel it toward the screens.

Figure 1:
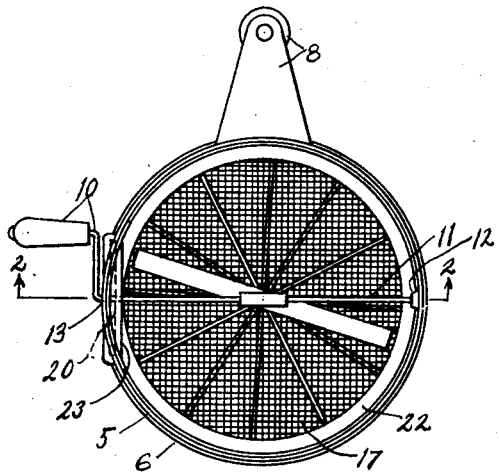
Fig. 1 is a top view of our improved device.
Figure 3:
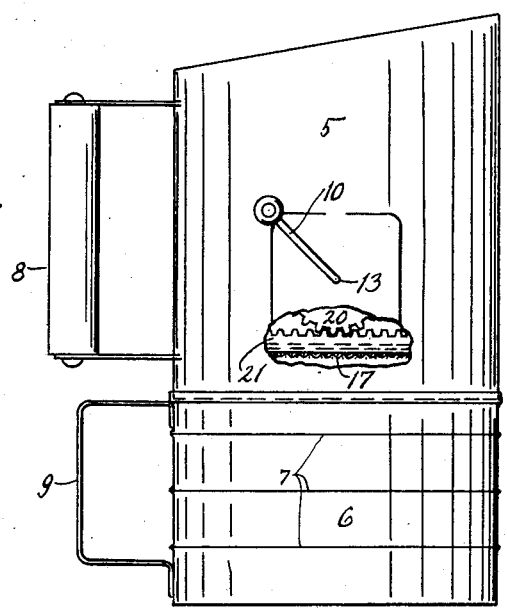
Fig. 3 is a partly sectional side elevation of our device.

When the crank 10 is turned the propeller or stirrer 19 and the spiders 18 are all rotated simultaneously by a gear 20 fixed on shaft 11 near the inner side of shell 5 and meshing at its lower side with a suitable ring gear 21 arranged in horizontal plane and fixed to the outer ends of the arms of the uppermost spider 18 and arranged to rotate in concentric relation to the shell. Said ring gear is preferably of L-shape in cross section and rotates under a circular sheet metal shield 22 suitably fixed to the interior of shell 5 and being continuous except where it registers with the lower end of a flanged vertically disposed gear housing 23 suitably welded, or otherwise fixed to the interior of shell 5 (see Figs. 2 and 3). The arms of the spiders 18 are staggered in horizontal relation to each other, that is for example, if the spiders each have four arms as shown, the center spider arms are spaced 30 degrees from the arms of the topmost spider and the lowest spider arms 30 degrees from the middle-spider arms, thus insuring thorough sifting of flour in successive steps as it goes from one screen to the other and finally drops into the measuring cup 6.

The operation and use of our device is already fully disclosed. It is obvious that the stirring wings 19 cut any lumps of flour and reduce the flour to a uniform consistency before the sifting process. After the flour has thus been stirred or whipped by the winged element and then sifted through the plurality of sieves or screens it is in the proper condition as usually called for in various recipes in baking.

We claim:

1. In a flour sifter, an upright cylindrical shell, a number of horizontally arranged vertically spaced screens fixed in the lower portion of said shell, a vertical central shaft mounted in the lower portion of the shell and extending through said screens and vertically above them, radially armed spiders fixed on said vertical shaft and arranged one above each screen, a drive shaft arranged diametrically across the shell and a crank on said shaft externally of the shell, means for rotating the said spiders on the vertical shaft when said crank is rotated, said latter means comprising a drive gear mounted on said drive shaft, a ring gear within the shell and meshing with said drive gear said ring gear fixed to the uppermost screen spider, and a circular guard fixed in said shell above said ring gear.

2. The structure specified in claim 1 and a gear housing for said drive gear comprising a sheet metal shell with a wall arranged in a plane parallel to the said drive gear and interiorly thereof in the shell, said housing communicating with said gear housing.

3. The structure specified in claim 1 and a flour cutting and stirring arm fixed on said vertical shaft above the screen and comprising a propeller-like blade with diametrically opposite arms and fixed on said vertical shaft, said arms being of flat material and twisted in an angular plane from the fulcrum toward their free ends.

4. The structure specified in claim 1, and a fixed spider arranged in a horizontal plane across the bottom of the shell, the lower end of said vertical shaft journaled in said spider, a central bearing member for the upper end of said vertical shaft said bearing being of T-shape, the upper end of said vertical shaft journaled in the vertically depending leg of said bearing member, the horizontal part of the T-shaped bearing bored longitudinally to serve as a bearing for the central part of the main drive shaft.

In testimony whereof we affix our signatures.

TORNEY O. NALL.
ERNEST J. BEAUVAIS.